July 3, 1956
G. A. WISWELL
2,753,442
WARNING LAMP ASSEMBLY
Filed Nov. 1, 1954
2 Sheets-Sheet 1
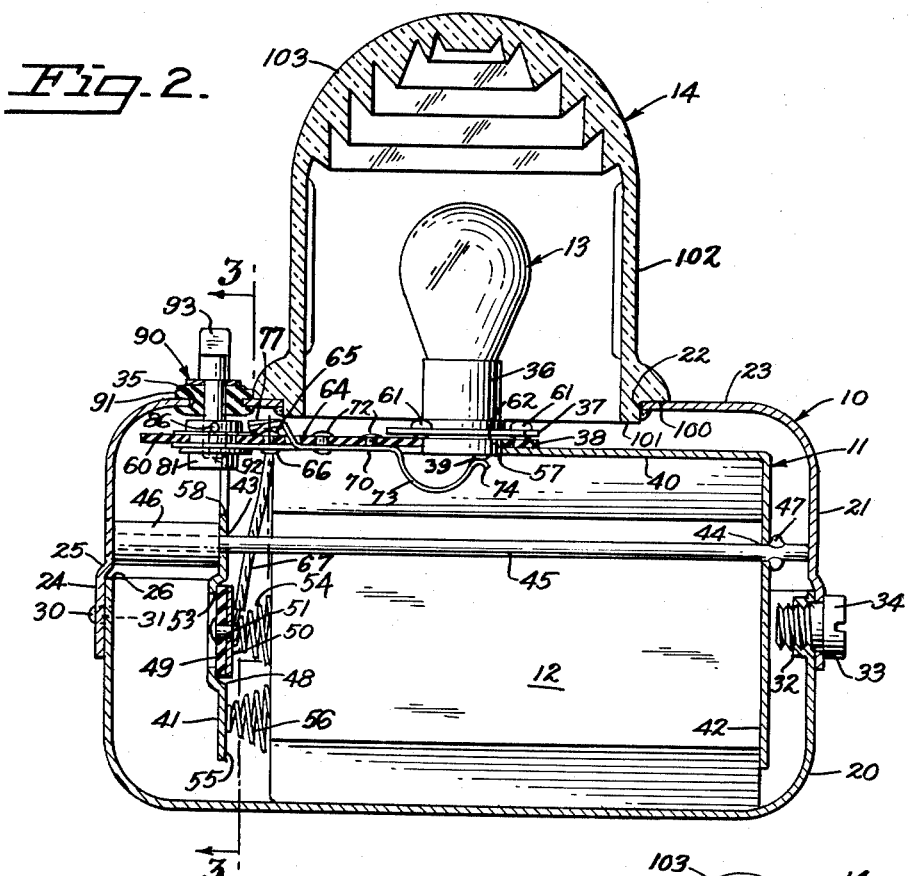
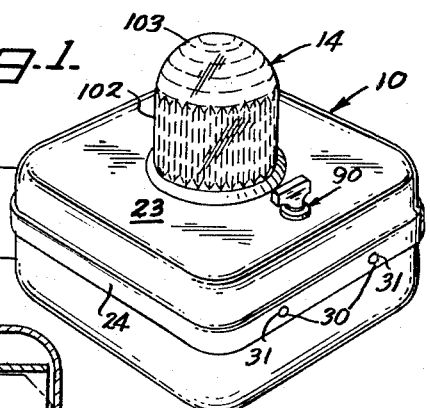
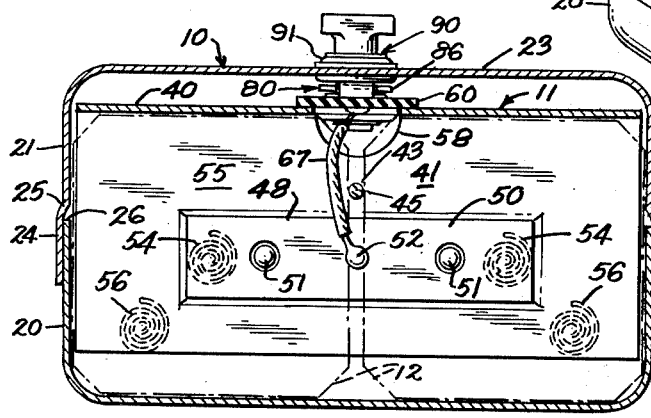
INVENTOR.
GRANT A. WISWELL
BY
ATTORNEY July 3, 1956

G. A. WISWELL 2,753,442

WARNING LAMP ASSEMBLY

Filed Nov. 1, 1954

INVENTOR.
GRANT A. WISWELL
BY
ATTORNEY

United States Patent Office 2,753,442
Patented July 3, 1956

2,753,442

WARNING LAMP ASSEMBLY

Grant A. Wiswell, Burlingame, Calif., assignor, by mesne assignments, to W. M. Patterson, San Francisco, Calif.

Application November 1, 1954, Serial No. 465,813

8 Claims. (Cl. 240—10.6)

This invention relates to an improved warning lamp assembly. More particularly, the invention relates to a compact, shock-resistant, reliable, battery-type, all-weather lantern suitable for warning on-coming motorists of highway obstructions and other dangers.

In a previously-filed co-pending application, Serial No. 432,957, filed May 28, 1954, I described and claimed a highway warning lamp suitable for heavy duty, long-term use. The present application incorporates additional novel features, which make it possible to employ the same general principles in a less expensive, lighter duty construction, adapted for such uses as replacing the warning flares carried by vehicles and posted near vehicles stopped for roadside repairs or at the side of the road.

Like the invention described in Serial No. 432,957, this invention solves many problems that heretofore had caused wide-spread dissatisfaction with the various types of lamps and lanterns that were used to avoid accidents while roadside repairs were in progress and were used to mark construction work ditches, wrecks, obstructions, and other danger spots on or adjoining the roads. The oil flare pots and kerosene lanterns, universal for many years, were always far from satisfactory. Their fuel burned out after a relatively few hours, so they had to be refilled frequently. The flame was often blown out by strong winds or quenched by rains. Also, when these flare pots or lanterns were knocked over or blown over, their flame was either extinguished, so that it no longer gave a warning light, or it was likely to ignite other objects, spread, and cause dangerous fires.

Various types of electric lamps or lanterns have been devised in an attempt to solve the problem but with indifferent success. Some have required complicated and expensive circuits, and none have proved completely satisfactory for all-weather usage. They have tended to require considerable maintenance, have given too little light for the amount of power consumed, have tended to get out of order, and have been easily damaged or broken.

The present invention, which has solved these problems, includes a two-piece metallic case that contains the battery, the bulb, and the electric circuit connecting the battery and bulb. The structure of the case, like that in application Serial No. 432,957, provides maximum protection from the weather and sheds rain without letting it damage the batteries, bulb, or circuit. The case is preferably surmounted by the dome-shape lens claimed in application Serial No. 432,957, whose novel design takes fullest advantage of the illumination supplied by the bulb. The bulb is preferably the one disclosed in my co-pending application, Serial No. 399,215, filed December 21, 1953, and can provide either an intermittent or a steady light.

The present invention combines with those elements a novel member inside the case that supports and spaces the batteries, supports the bulb and includes the electrical circuit connecting the bulb and batteries. As a result of the simplicity of its construction, operation is practically foolproof, and uniformity in quantity manufacture can be achieved quite simply. The device is completely reliable; at the same time it is relatively inexpensive as compared with other lamps seeking to solve the same problem.

Other objects and advantages of the invention will appear from the following description of a preferred embodiment presented in accordance with 35 U. S. C. 112.

Fig. 1 is a view in perspective of a complete lamp assembly embodying the principles of the present invention.

Fig. 2 is a somewhat enlarged view in section of the lamp assembly.

Fig. 3 is a reduced view in section but taken along the line 3—3 of Fig. 2.

Figure 4:
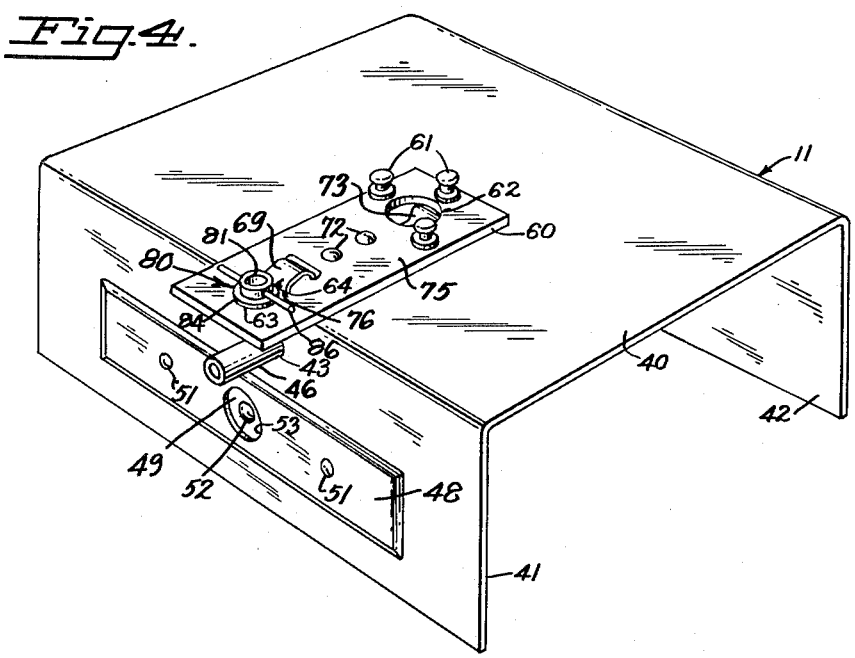
Fig. 4 is a view in perspective of the member that holds the batteries, supports the lamp and connects the lamp to the batteries.
Figure 5:
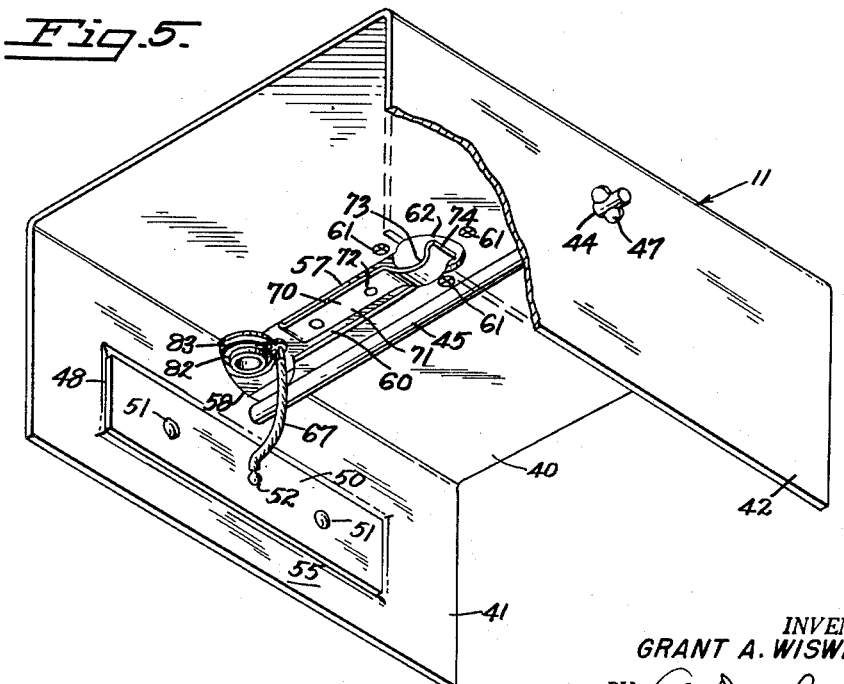
Fig. 5 is a view in perspective like Fig. 4, but with portions thereof removed to show parts concealed in Fig. 4.

The lamp assembly of this invention includes an outer case 10, an inner case or frame 11 which supports the batteries 12 and the lamp 13, and a dome-shaped multi-prism-type lens 14.

The case 10

The case 10 serves to contain all the working parts and to protect them from the elements. It is very similar to the case disclosed and claimed in Serial No. 432,957 and comprises a lower half 20 and an upper half 21. Preferably, it is made from relatively strong metal, so that it can withstand the rigorous treatment which such lamps are normally given. For less rigorous uses the case 10 may be plastic or other suitable material.

The lower case half 20 is a five sided box, here shown as substantially square with rounded corners. It is open at the top and is normally made of a size to accommodate two batteries 12, preferably of the 4F 6-volt heavy-duty lantern type. The case 10 may, however, be made to hold different types of batteries, and may hold more or fewer batteries.

The upper case member 21 is generally about the same size and shape as the lower member 20 except for a large central round opening 22 on its upper face 23 where the dome lens 14 is secured and for the outwardly flared enlarged band portion, apron, or flange 24 at the lower open end which fits over the lower case member 20. The flange 24 results in a planar shoulder 25 which engages the upper planar edge 26 of the lower case member 21. It also sheds rainwater and prevents water from getting inside the case 10 where it could attack the batteries 11 and other parts.

A pair of outwardly projecting members 30 on one side face of the lower case member 20 are adapted for insertion in a pair of perforated means or holes 31 in the upper case member 21. A threaded opening 32 in the opposite face of the lower case member 20 mates with a slightly larger unthreaded opening 33 in the upper case member 21 and receives a locking bolt 34. The bolt 34 may be as shown or may be provided with an enlarged hexagonal head and a cylindrical shank substantially larger in diameter than the threaded opening 32, so that a bracket and a lock may be applied for securing the case 10 to an anchor as a protection against the lamp being stolen.

The upper case member 21 is also provided with a smaller opening 35 adjacent the opening 22 to receive the switch operating member 90 discussed later on. The operation and description of this member 90 will be given later in connection with the description of frame 11, whose switch 80 it controls.

The lamp bulb 13

The lamp bulb 13 is preferably of the type fully described and claimed in my co-pending application Serial No. 399,215, filed December 21, 1953, though other types of bulbs can be used. That bulb makes it possible to have either an intermittent light or a steady light depending upon the type of service for which the lamp is intended. Preferably the lamp bulb 13 has a base 36 provided with a horiozntal flange 37 which is perforated by a plurality, preferably three, keyed holes 38. The holes 38 are adapted to mate with projections or posts 61 on the frame 11. The flange 37 serves as one of the electrical contacts for the filament in the bulb. The other contact 39 is at the bottom of the base 36 and is insulated from the flange 37.

Inner case or frame 11

The frame 11 supports the batteries 12, the lamp bulb 13, and the electric circuit connecting them. The frame 11 includes a horizontal metal plate 40 and depending side plates 41 and 42, which may be integral therewith. The side plates 41, 42 are pierced by aligned openings 43, 44 through which a rod 45 extends. The rod 45 serves to separate and position the two batteries 12, which are placed on their sides with their contacts facing the side plate 41, their bases resting against the side plate 42, and one side resting against the plate 40. The rod 45 has an enlarged extending end 46 which may comprise a tube of insulating material, and engages the case 10 serving to position the frame 11 accurately therein. The rod 45 also has an enlarged portion 47 that engages the frame 11 and assures positive alignment.

The side plate 41 may have an indentation 48 to receive a strip 49 of insulating material supporting a metal contact surface 50 and insulating it from the frame 11. The studs or rivets 51 that secure the strip 49 to the frame 11 are insulated from the surface 50, and the rivet 52 that secures the surface 50 to the strip 49 is prevented from contacting the plate 41, as by the perforation 53. The surface 50 serves as contactor for the center terminals 54 of the batteries 12, while the remaining unindented inner face 55 of the frame side plate 41 serves as contactor for the outer terminals 56 of the batteries 12.

The horizontal plate 40 is preferably provided with a punched out portion 57 and an adjoining portion 58 of the side plate 41 may also be punched out. A control plate 60 of insulating material is supported on the upper surface of the plate 40 over the punched out area 57, preferably being secured to the plate 40 by posts 61 which support the lamp 13, the lower ends of the posts 61 being bent out into electrical contact with the plate 40, so as to connect electrically the outer battery terminals 56 to the lamp 13.

The control plate 60 has three openings therethrough: a round central opening 62 into which the lamp base 36 projects, a round opening 63 at one side, where the switch 80 fits, and a slit 64, availed of in the circuitry. A metal stud or rivet 65 extending through the control plate 60, has its lower end 66 electrically connected by a wire 67 to the contact surface 50, and thus to the battery center terminals 52. Adjacent the rigid head of the stud 65 but separated therefrom is the free end 69 of a metal strip 70. The strip 70 (preferably spring copper) has a straight portion 71 secured to the control plate 60, as by rivets 72. From one end of its straight portion 71 a generally arcuate portion 73 extends, across the round opening 62, ending with a reversely bent end portion 74 in contact with the contact member 39 of the lamp bulb 13, the arcuate portion 73 forming a spring means to insure contact and pressure. From the other end of the straight portion 71, the strip 70 extends through the slot 64 to the upper surface 75 of the plate 60, where it terminates in the free end 69 above the surface 75 and generally parallel to it. A bent down corner 76 extends to the surface 75 to provide a stop for the switch 80 and also insures the proper spacing of the end 69 above the surface 75, while an upwardly tilted or cammed corner 77 aids in the operation of the switch 80, providing a guide means therefor.

The switch 80 includes a tubular sleeve 81 that extends through the opening 63 and is retained in position by washers 82, 83, and 84. The washer 82 is a split metal ring that fits in an annular groove in the sleeve 81 while the washer 83 is a ring of insulating material fitting between the washer 82 and the lower surface of the plate 60. A metal cross pin 86 extends diametrically across the sleeve 81 and extends considerably beyond it providing arms, and this pin 86 is preferably separated from the upper plate surface by the insulating washer 84. When the sleeve 81 is rotated, either one of the projecting arms of the pin 86 may enter under the cammed corner 77 of the strip 70, until the pin 86 contacts both the rivet 65 and the free end 69 of the bent strip 70, joining them electrically. Since the flange 37 of the lamp 13 is permanently connected on the three posts 61 and since the contact 39 is permanently connected to the strip 70, this action completes the electrical circuit between the battery center terminals 54 and the battery outer terminals 56. Electricity then flows from the center terminals 54 to the contact surface 50, through the wire 67 to the rivet 65, the pin 86, the strip 70, the lamp terminal 39, and thence to the lamp filament. From there it passes, via the flange 37, to the posts 61, the plates 40 and 41, and into the battery outer terminals 56.

The switch 80 is controlled from outside the case 10 by means of an operating member 90 preferably comprising a keyed-head screw sealed into the opening 35 in the case 10 by a grommet 91 and extending down a substantial distance inside the case 10. The inner end of the screw 90 is tubular, is threaded interiorly, and is split at 93 so that it bridges the cross pin 86. In this way, the socket head split screw 90 is locked to the cross pin 86 of the switch 80. The switch 80 can therefore be operated by rotating the keyed head 93 of the screw 90, thereby turning the sleeve 80 and its cross pin 86.

The dome lens 14

The dome lens 14 preferably comprises a unitary member of plastic, which is able to withstand hard treatment, but for less rigid uses a glass dome could be used. Preferably it is made as in application Serial No. 432,957, and it may be clear or colored, depending upon the uses for which it is intended. The dome 14 is provided with a circular flanged base whose shoulder 100 rests on the top face of the upper case member 21 around the opening 22. A downwardly depending portion 101 extends into the opening 22. The connection is sealed, preferably by a reliable water-tight cement.

The dome 14 above the flange 100 comprises a generally cylindrical portion 102 and a hemispherical portion 103. The outer surface of both these portions is smooth, but the inner surfaces are prismatic, so that the light rays are sent out in the most advantageous directions, as described in my aforementioned application, Serial No. 432,957.

Assembly and operation

In assembly, the batteries 12 are loaded into the frame 11, with the terminals 54, 56 facing the side plate 41, but otherwise disposed in any direction. The center battery terminals 54 will then contact the surface 50, while the outer battery terminals 56 will contact the side plate 41. The lamp 13 is mounted on the posts 61, so that the frame 11 supports the entire illumination circuit. The assembled frame 11, batteries 12, and lamp 13 are then inserted into the upper case half 21 which is factory assembled to include the screw 90 and dome 14 both mounted permanently in position. The switch 80 is locked into the screw 90, thus completing the assembly of the upper half of the unit.

Now the upper case 21 can be inserted over the lower half 20. The upper case 21 is held almost perpendicular to the lower case 20, while aligning the projecting members 30 through the openings 31, and then the upper case 21 is swung down over the lower half 20 until the shoulder 25 rests on the edge 26 and serves to prevent further movement and insures the proper alignment. Finally, the bolt 34 is inserted through the opening 33 of the upper case 21 into the threaded opening 32 of the lower case 20 and is secured tightly in place.

When assembled, the unit will normally be in the light-off position. When it is desired to turn the lamp on, the head 93 of the screw 90 is turned clockwise, as seen by the operator, thereby sending one arm of the cross pin 86 in between the strip 70 and the rivet 66 and completing the circuit between the lamp 13 and the batteries 12.

The lamp 13, whether intermittent or steady, will send out a light in all directions. The light which is sent out through the cylindrical dome portion 102 appears as a horizontal slit between two bright virtual images, because of its vertical prisms, while the coaxial series of ring prisms in the hemispherical portion 103 send out a vertical beam of light that cooperates with the vertical light beams to form an inverted T-shaped emission pattern.

It is obvious that, since the dome 14 and grommet 91 are watertight connections to the upper case 21 and since the flange, apron, or skirt 24 of the upper case 21 extends down over the upper part of the lower case 20, no rain can leak into the device and damage the batteries 12. The device is adapted to withstand rugged treatment, the lamp bulb being adequately protected by the other members, and all of the parts may be made in quantity without calling for special machine work.

To those skilled in the art to which this invention relates many changes in construction and widely differing embodiments and applications of the invention will suggest themselves without departing from the spirit and scope of the invention. The disclosures and the description herein are purely illustrative and are not intended to be in any sense limiting.

I claim:

1. A warning lamp assembly, including in combination: an outer case having a transparent portion; an inner frame of electrically-conductive material comprising a horizontal plate with a central opening and first and second vertical side plates at opposite ends of said horizontal plate; a strip of electrically-insulating material secured on the inner face of said first side plate; a strip of electrically-conductive material secured to the inner face of said insulating strip and thereby insulated from said inner frame; electrically-conductive means on the inner face of said insulating strip insulated from said electrically conductive strip and connected to said inner frame; a control plate of insulating material secured to said horizontal strip and having an opening therethrough at approximately the center of said horizontal plate; a metal member secured to said control plate and having a portion extending into said opening and also having a contact portion; cooperating contact means secured to said control plate and spaced from said contact portion; means electrically connecting said electrically conductive strip to said cooperating contact means; metal posts around said central opening electrically connected to said frame; a lamp bulb adapted to shine through said transparent portion and supported on said metal posts and in electrical contact therewith and also in electrical contact wtih said metal member; battery means held by said inner frame, with the bottom of said battery means abutting said second side plate, the inner terminals of said battery means in contact with said first electrically conductive means, and the outer terminals in contact with said conductive strip; and externally operable switch means for opening and closing contacts between said contact portion and said cooperating contact means for closing the circuit between said battery means and said lamp.

2. A frame for a warning lamp assembly, adapted to support the battery means, the lamp bulb, and the electrical circuit connecting them, including in combination: electrically-conductive material comprising a horizontal plate, having a central opening, and first and second vertical side plates at opposite ends of said horizontal plate; a strip of electrically-conductive material constituting first terminal-contacting means mounted on said first side plate and insulated therefrom; second electrically-conductive terminal-contacting means insulated from said electrically conductive strip and connected to said first side plate; a metal member insulated from said horizontal plate having at one end a lamp-bulb contacting portion extending into said central opening and at the other end a contact portion; cooperating contact means secured to said control plate and spaced from said contact portion of said metal member; means electrically connecting said electrically conductive strip to said cooperating contact means; metal lamp-bulb supporting posts around said central opening; and switch means for opening and closing contacts between said metal member end and said cooperating contact means for closing the circuit between said battery means and said lamp.

3. A frame for a warning lamp assembly, adapted to support the battery means, the lamp bulb, and the electrical circuit connecting them, including in combination: electrically-conductive material comprising a horizontal plate, having a central opening, and first and second vertical side plates at opposite ends of said horizontal plate; a strip of electrically-conductive material constituting first terminal-contacting means mounted on said first side plate and insulated therefrom; second electrically-conductive terminal-contacting means insulated from said electrically conductive strip and connected to said first side plate; a control plate of insulating material secured to said horizontal strip and overlying said opening through said horizontal plate and having an opening positioned above and aligned with the central opening of said horizontal plate; a metal member having a portion secured to said control plate and having at one end a lamp-bulb contacting portion extending into said central opening and at the other end a contact portion; cooperating contact means secured to said control plate and spaced from said contact portion of said metal member; means electrically connecting said electrically conductive strip to said cooperating contact means; metal lamp-bulb supporting posts around said central opening; and switch means for opening and closing contacts between said metal member end and said cooperating contact means for closing the circuit between said battery means and said lamp.

4. A warning lamp assembly, including in combination: an outer case having a transparent portion; an inner frame of electrically-conductive material comprising a horizontal plate with a central opening and first and second vertical side plates at opposite ends of said horizontal plate, said first side plate having a generally rectangular outwardly-indented portion; a strip of electrically-insulating material secured on the inner face of said independent portion; a strip of electrically-conductive material secured to the inner face of said insulating strip and thereby insulated from said inner frame; electrically-conductive means on the inner face of said insulating strip and insulated from said electrically conductive strip and connected to said inner frame; a control plate of insulating material secured to said horizontal strip and with an opening overlying said opening through said horizontal plate; a metal member having a portion secured to said control plate and having at one end a springy portion extending into said central opening and at the other end a contact portion; cooperating contact means secured to said control plate and spaced from said contact portion of said metal member; means electrically connecting said electrically conductive strip to said cooperating contact means; metal posts around said central opening; a lamp bulb supported on said metal posts and in electrical contact therewith and also in electrical contact with said springy portion of said metal member; battery means held by said inner frame, with the bottom of said battery means abutting said second side plate, the inner terminals of said battery means in contact with said first electrically conductive means, and the outer terminals in contact with said conductive strip; and externally operable switch means for opening and closing contacts between said metal member end and said cooperating contact means for closing the circuit between said battery means and said lamp.

5. A warning lamp assembly, including in combination: an outer case having a lens portion; an inner frame inside said outer case comprising a unitary sheet of metal bent to provide a horizontal plate and first and second vertical side plates at opposite ends of said horizontal plate, said horizontal plate having an opening therethrough extending in from approximately the center of the corner where it meets said first side plate to approximately the center of said horizontal plate, said first side plate having a generally rectangular outwardly-indented portion with a central perforation therethrough; a strip of electrically-insulating material secured in the inner face of said indented portion by first electrically-conductive rivet means passing through said strip and said first side plate; a strip of electrically-conductive material secured to the inner face of said insulating strip, and thereby insulated from said inner frame, by second electrically-conductive rivet means positioned at said first side plate perforations so as to be insulated from said inner frame, said conductive strip having perforations so as to expose said first rivet means and insulate said rivet means from said conductive strip; a control plate of insulating material overlying said opening through said horizontal plate and having three openings therethrough, an innermost one at approximately the center of said horizontal plate, an outermost one approximately above the corner where said horizontal plate and said first vertical plate meet, and an intermediate one; a metal member having a portion secured to the lower face of said control plate and having a springy portion extending into said innermost opening and a portion extending through said intermediate opening and terminating in a free contact end; cooperating contact means secured to said control plate and spaced from said free contact end; electrically conductive means connecting said second rivet means to said cooperating contact means; metal posts around said innermost opening securing said control plate to said horizontal plate; a lamp bulb supported in said lens portion on said metal posts and in electrical contact therewith and also in electrical contact with said springy portion of said metal member; battery means held by said inner frame, with the bottom of said battery means abutting said second side plate, the center terminals of said battery means in contact with said first rivet means, and the outer terminals in contact with said conductive strip; and externally operable switch means in said outermost opening through said control plate, for opening and closing contacts between said free contact end and said cooperating contact means, thereby opening and closing the circuit between said battery means and said lamp.

6. The assembly of claim 5 in which said switch means includes a sleeve rotatably mounted in said control plate, a linear transverse metal pin extending diametrically across said sleeve and therebeyond, providing an arm adapted to bridge between said free contact end and said cooperating contact means on said plate, said case having an opening therethrough adjacent to and aligned with said sleeve, a grommet-mounted tubular member sealed in said opening for rotation therein, said tubular member having a keyed head on the outer side of said case, said tubular member having a notch extending thereacross and keyed to said pin.

7. The assembly of claim 5 in which there are batteries and a transverse rod extending across between said side plates and therebeyond into contact with said case, said rod serving to space said batteries in said frame and said frame in said case.

8. A battery-holding and lamp-supporting inner frame for a warning lamp assembly, including in combination: a sheet of metal bent to provide a horizontal plate and first and second vertical side plates at opposite ends of said horizontal plate, said horizontal plate having an opening therethrough extending in from approximately the center of the corner where it meets said first side plate to approximately the center of said horizontal plate, said first side plate having a generally rectangular outwardly-indented portion with a central perforation therethrough; a strip of electrically-insulating material secured on the inner face of said indented portion by first electrically-conductive rivet means passing through said strip and said first side plate; a strip of electrically-conductive material secured to the inner face of said insulating strip and thereby insulated from said inner frame, by second electrically-conductive rivet means positioned at said first side plate perforations so as to be insulated from said inner frame, said conductive strip having perforations so as to expose said first rivet means and insulate said rivet means from said conductive strip; a control plate of insulating material overlying said opening through said horizontal plate and having three openings therethrough, an innermost one at approximately the center of said horizontal plate, an outermost one approximately above the corner where said horizontal plate and said first vertical plate meet, and an intermediate one; a metal member having a portion secured to the lower face of said control plate and having a springy portion extending into said innermost opening and adapted for contact with a supported lamp and a portion extending through said intermediate opening and terminating in a free contact end; cooperating contact means secured to said control plate and spaced from said free contact end; electrically conductive means connecting said second rivet means to said cooperating contact means; metal lamp-supporting posts around said innermost opening securing said control plate to said horizontal plate; whereby when battery means are held by said inner frame, with the bottom of said battery means abutting said second side plate, the inner terminals of said battery means in contact with said first rivet means, and the outer terminals in contact with said conductive strip an electrical circuit to said lamp is formed; and externally operable switch means extending through said outermost opening through said control plate, for opening and closing contacts between said free contact end and said cooperating contact means for closing said circuit.

References Cited in the file of this patent

UNITED STATES PATENTS

| | | |
|---|---|---|
| 2,320,446 | Peterson | June 1, 1943 |
| 2,492,837 | Briggs | Dec. 27, 1949 |
| 2,534,945 | Booth | Dec. 19, 1950 |
| 2,611,072 | Potekin | Sept. 16, 1952 |